No. 849,033. PATENTED APR. 2, 1907.
R. W. WELLER.
HAY LOADING APPARATUS.
APPLICATION FILED OCT. 3, 1906.
2 SHEETS—SHEET 2.
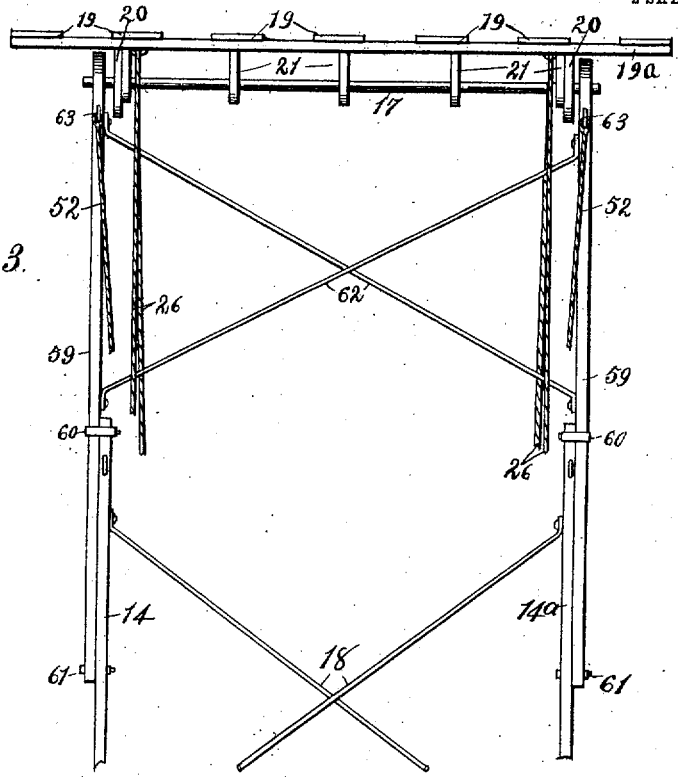
Fig. 3.
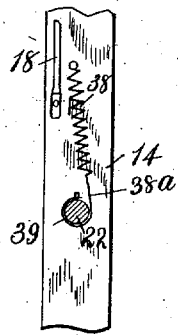
Fig. 4.
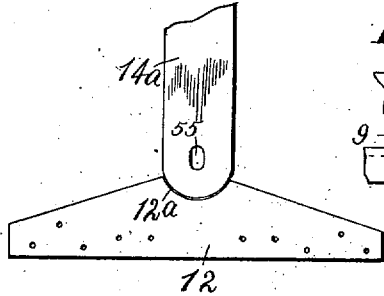
Fig. 5.
Fig. 6.
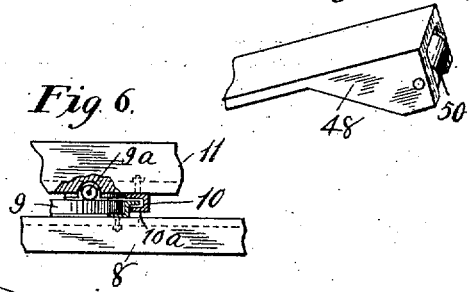
Fig. 7.
Witnesses:
C. F. Bassen
Matt J. Marty
Inventor
Robert W. Weller
By Frederick Benjamin
Atty.
THE NORRIS PETERS CO., WASHINGTON, D. C.

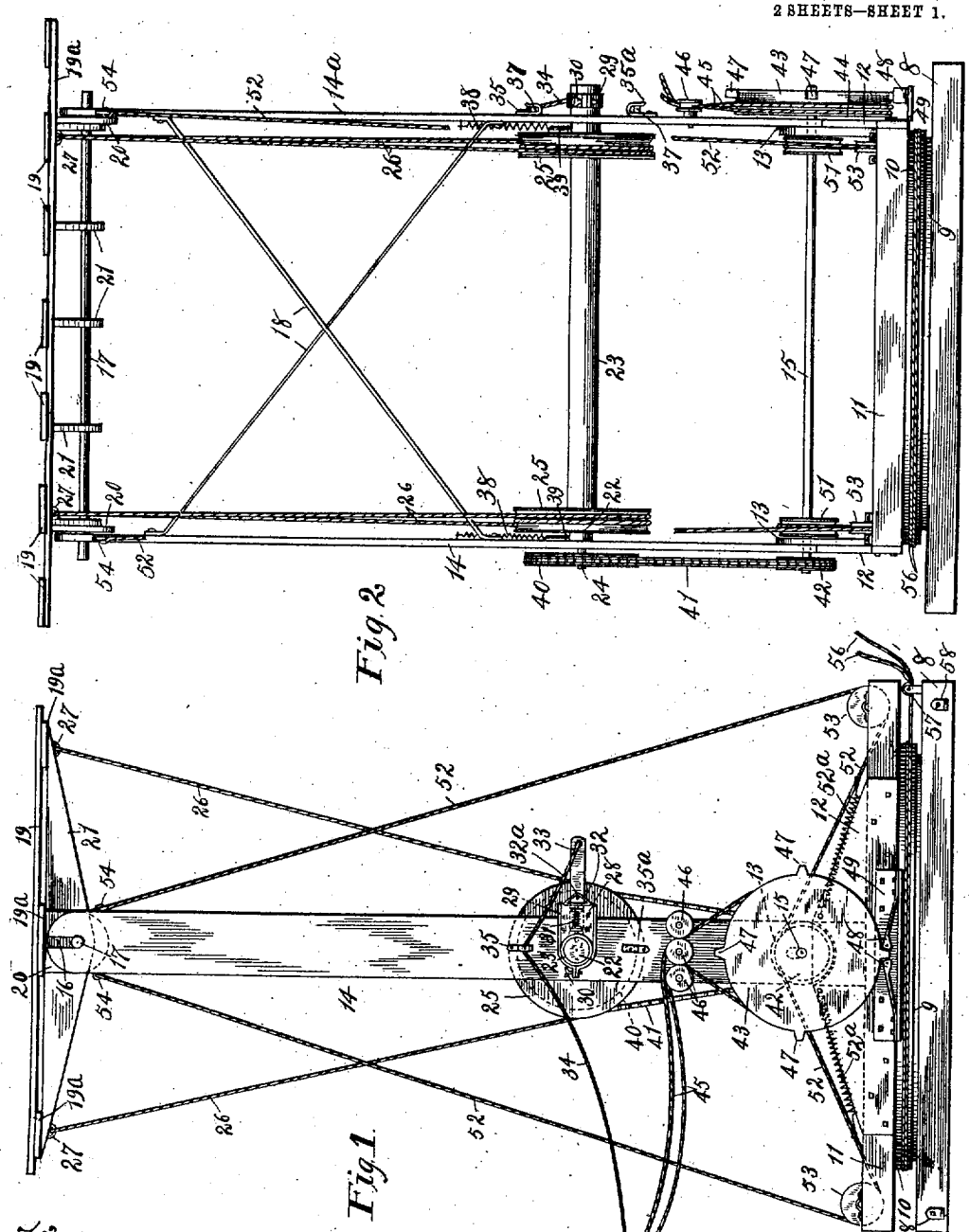

UNITED STATES PATENT OFFICE.

ROBERT W. WELLER, OF PACKWOOD, IOWA.

HAY-LOADING APPARATUS.

No. 849,033.   Specification of Letters Patent.   Patented April 2, 1907.

Application filed October 3, 1906. Serial No. 337,192.

*To all whom it may concern:*

Be it known that I, ROBERT W. WELLER, a citizen of the United States, residing at Packwood, in the county of Jefferson and State of Iowa, have invented certain new and useful Improvements in Hay-Loading Apparatus, of which the following is a specification.

My invention relates to agricultural implements, and refers especially to that class of apparatus employed in stacking or storing hay, straw, or other products of similar nature.

The principal objects of my invention are to provide a stacking or mowing device that will have greater efficiency than the appliances in common use; to produce an apparatus for distributing hay that can be utilized for building stacks of any shape or dimensions; to furnish an apparatus for storing hay in barns or barracks that can be used to advantage in structures of any shape, whether round, octagonal, or rectangular; to supply simple means for controlling the mechanism so that one operator can readily and easily manipulate the apparatus while working to full capacity; to construct an appliance for handling hay or grain in bulk that can be controlled from any neighboring point, whether upon the ground or a scaffold or the roof of a building; to so design and construct the apparatus that many of the movements can be automatically performed; to arrange the parts so that a minimum amount of power will be required to perform the function assigned thereto, and to produce an apparatus for the purpose specified that will be simple in construction, economical to manufacture, and that can be readily understood and easily managed by a person of ordinary intelligence. I attain these and other minor objects by the use of an apparatus which comprises, generally speaking, a base upon which the structure rests, a frame supporting an elevated platform upon which the material to be distributed is placed, means for turning the apparatus in various directions, guiding-ropes and pulleys by means of which the platform can be tilted to discharge its load, and automatic mechanism for controlling the various movements.

My improvement is fully and clearly described, and illustrated in the accompanying drawings, which form a part of this specification, and more completely set forth in detail in the claims hereto appended.

In the drawings, Figure 1 is an end elevation of my improved hay and straw distributer. Fig. 2 is a side elevation. Fig. 3 is a fragmentary view of the extension. Fig. 4 is a fragmentary view showing the automatic device for restoring the receiving-platform. Fig. 5 is a side view of one of the end brackets with the lower end of one of the standards. Fig. 6 is a view, partly in section, of a fragment of the base and one of the sills with a portion of the track; and Fig. 7 is a perspective view of a portion of one of the stop-blocks.

Referring to the drawings, the numeral 8 indicates a base upon which is laid a circular track composed of an annular rail 9, upon which rest rollers $9^a$, and a circular flange, having a depending rim 10, from which hooks $10^a$ project radially inward to prevent displacement during the operation of the appliance. Frame-sills 11 are supported by the circular track and are provided with bracket-plates 12, bolted to each end and supported on their inner sides by braces 13. The upper margins of the plates 12 are provided with concave recesses $12^a$, within which rest the lower ends of the standards 14 $14^a$, which are rounded to engage said recesses. A main shaft 15 passes through the lower ends of the said standards. The upper ends of the standards are provided with slots 16, in which are received the ends of a shaft 17 and are secured from spreading by tie-rods 18. A receiving-platform is provided, said platform being formed of thin boards 19, laid upon sills $19^a$, supported by braces 20 and brackets 21, through which the shaft 17 passes, thus insuring a rigid support for the platform and as the weight is borne by said shaft permitting of a lateral tilting of the said platform. This construction will allow of the use of comparatively light material for the platform, and the weight is further lessened by spacing the boards 19 some distance apart.

At a suitable distance above the sills 11 is placed a shaft 22, which extends between the standards 14 $14^a$ and is provided with a sleeve 23, which, together with the shaft, passes through the standard $14^a$, but falls short of the opposite standard 14, through which the end 24 of the shaft, reduced in size, extends. Upon said sleeve are mounted duplicate grooved pulleys 25, about which are wound one or two turns of cables or ropes 26, each end of these cables being carried upward to the under side of the receiving-platform 19, where they are drawn taut and secured to eyebolts 27.

The end of the sleeve 23 which projects through the standard 14ª is provided with a block 28, secured thereto by a band 29, which is fastened to the block 28 and engages the sleeve, being held in frictional engagement therewith by a clamping-screw 30. By loosening this screw the block and attachments can be thrown to either side of the sleeve, where it is held by tightening said screw. A spring-bolt 31, sliding in guides fastened to the block 28, is adapted to engage holes in both sleeve and shaft, thus preventing them from being independently rotated when the bolt is in engagement therewith.

The free end of the spring-bolt 31 is extended laterally and provided with a triangular cam-aperture 32. Two sides of said aperture lie obliquely to the direction of movement of the bolt 31, and a lug or pin 32ª, fixed in a lever 33, against the face of which said bolt lies, is received within the said aperture. The lever 33 is pivoted to the block 28 and may be moved in either direction, up or down, and when so moved the pin 32ª will engage one of the inclined faces of the said cam-aperture and retract the spring-bolt 31, which will be automatically extended by the action of its spring when the said lever is returned to its initial position, which is shown in Fig. 1. The said lever is operated by a rope 34, attached to its outer end and passing over a hook 35, carried to any convenient locality and temporarily fastened to a cleat or hook 36. The hook 35, bolted to the standard 14ª, is furnished with a friction-roller 37. A companion hook 35ª is secured in a reversed position to the face of the standard 14ª below the shaft 22 and is used in the same manner as the upper hook when the lever 33 is to be carried downward. The shaft may be turned in either direction by the action of the device just described, and as soon as the rope 34 is released the tension of a spring 38, secured to the inner face of the standard 14, will restore the shaft to its initial position through the medium of a short cable 39, which is secured at one end to the spring and by the other to the said shaft. A similar spring and cable are fixed to the standard 14ª, the only difference being that the cable in this instance is fixed to the sleeve 23.

In Fig. 4 the parts are shown in the positions which they will assume when the shaft 22 has been given one turn and before it has been restored to its initial position.

Upon the projecting end 24 of the shaft 22 is keyed a sprocket-wheel 40, which connects by a sprocket-chain 41 with a smaller sprocket 42, fixed to the shaft 15, external to the standard 14.

To the opposite end of the main shaft 15 is fixed an operating-wheel 43, a portion of its periphery 44 being adapted to receive one or two turns of a cable 45, both ends of which are carried over pulleys 46, pivoted to the standard 14ª and continued to any convenient point, as 36. The pulleys 46 (three in number) are deeply grooved for the passage of said cable 45 and are placed so that their edges approximate sufficiently to prevent the cable from being disengaged therefrom. To the periphery of said operating-wheel 43 are fixed lugs 47, which engage spring stop-blocks 48, secured to a bracket 49, bolted to the end plate 12. The ends of the stop-blocks are provided with friction-rollers 50.

Upon the shaft 15 are mounted duplicate grooved pulleys 51, about which are wound several turns of cables 52, which then pass around pulleys 53, fastened to the sills 11, whence they are carried upward and their ends secured in eyebolts 54, fixed in the edges of the standards 14 and 14ª.

To the cables 52 helical springs 52ª are fastened by one end, the other being secured to the bracket 12. The function of these springs is to restore the standards to their initial position when released after having been rocked upon their horizontal axis. To release the lugs 47 of the operating-wheel from engagement with the stop-blocks 48, the end of the said shaft which projects through the standard is raised by traction made equally upon both ends of the operating-rope 45. To permit of this movement, the standard 14ª is provided with a slot 55, through which the shaft 15 passes. This elevation of the shaft 15 and wheel is not necessary to lock the wheel, since the lugs 47 will depress one of the stop-blocks during the rotary movement and the latter will spring into place, and thus automatically lock the wheel in position. For the purpose of rotating the frame and supporting-sills about a vertical axis a cable 56 is wound upon the flange 10, the ends being carried around sheaves 57 and then led to any convenient location. Traction upon one end of this cable will cause the superstructure to be turned upon the circular track 9, so that either side of the receiving-platform 19 can be presented successively to every point of the compass. When handling heavy loads or tilting the structure to a wide angle, it may be necessary to anchor the base in order to insure stability. To this end the base is furnished with angle-irons 58, through which bolts may be passed to secure the apparatus to the floor.

It may sometimes be desirable, as in building very large stacks or in unusually high barns or barracks, to provide means for raising the receiving-platform to a greater height than the standard will permit. For this purpose I provide an extension composed of auxiliary standards 59, their upper ends being rounded and formed with slots to receive the ends of the shaft 17, as in the case of the main standards 14 14ª. These auxiliary members pass through retaining-bands 60, secured to the standards 14 14ª, and at their lower ends are secured by bolts 61. The auxiliary standards are braced by tie-rods 62 and the cables 52, disengaged from their eyebolts 54, are carried further upward and fastened to eyebolts 63 in the margins of the members 59.

The method of operating my improved hay-distributer is as follows: The apparatus having been located at the desired point, the hay is deposited upon the receiving-platform by any of the well-known forms of hay-handling devices in common use, said platform and standards being in the positions shown in Figs. 1 and 2, which is referred to as the "initial" position. The standards may be swung or tilted in either direction by manipulating the rope 45, and this movement will necessarily carry the receiving-platform in the same direction and also tilt the latter more or less, according to the degree of movement of the frame. This combination movement of frame and platform is required when it is desirable to deliver the material at a considerable distance from the base and is accomplished by first making traction upon both ends alike of the rope 45, which passes around the wheel 43. This will lift the said wheel and shaft 15, so that the lug 47, which is engaged by the stops 48, will be released. The operator now pulls upon one end only of the said rope, and this will turn the pulleys 51, and through the medium of the cables 52 cause the frame, composed of the standards 14 14ª and braces 18 and bearing the platform 19, to work or swing upon the shaft 15 to the desired angle. This partial revolution of the shaft 15 will be transmitted, through the chain 41, to the shaft 22, and through the medium of the cables 26, which are wound upon the pulleys 25, the platform 19 will be synchronously rocked or tilted and the load will be deposited by the action of gravity. As soon as the load has slipped from the platform the operator will release his traction upon the rope 45, and the action of the springs 38 and 52ª will carry the parts back to their initial position, where they will be automatically locked by the stop-blocks 48. If it is desired to tilt the receiving-platform without rocking the whole frame, as would be the case when the load was to be dumped close in toward the base, the operator will make traction upon the rope 34 to swing the lever 33 either upward or downward according to the position of said lever and the location of the rope upon the hooks 35 35ª, and this lever movement will act through the cam 32 to withdraw the spring-bolt from engagement with the shaft 22, and further traction upon said rope will rotate the sleeve 23 and through the medium of cables 26 will tilt the platform to the required angle. The springs 38 will restore the parts to their initial position when traction upon the operating-rope 34 ceases. By carrying the operating-ropes 34, 45, and 56 to one point all of the operations can be easily carried out by one person from that position. Thus all the movements can be positively controlled either from the ground or the top of the stack or the roof of the building. By first loosening the screw 30 the block 28 and lever 33 may be turned to the opposite side of the sleeve and secured by tightening the screw, thus permitting the platform to be operated from the opposite side of the machine.

It is obvious that many changes may be made in the devices of my invention as herein disclosed without departing from the spirit and scope thereof, and I do not wish, therefore, to be limited to the precise construction set forth.

Having thus described my invention, what I claim is—

1. An apparatus for the purpose specified including a base, a frame supported on said base, a platform carried on said frame, means for turning said frame on a vertical axis, means for rocking the platform-supports on a horizontal axis, and means for tilting said platform in opposite directions from its initial position.

2. An apparatus for the purpose specified including a base, sills supported on said base and carrying a frame, a platform borne by said frame, means for turning the sills and frame on a vertical axis, means for rocking the frame on a horizontal axis, and means for tilting said platform.

3. An apparatus for the purpose specified including a fixed base, sills mounted on said base, a movable frame supported on the sills, a receiving-platform carried on the frame, means for turning said sills and frame on a vertical axis, means for rocking said frame on a horizontal axis, means for locking the frame in its initial position and means for tilting said platform.

4. An apparatus for the purpose specified including a base, a circular track laid on said base, a movable frame supported on said track, a platform carried on said frame, means for turning said frame upon the circular track, means for rocking the frame, means for locking the frame in its initial position, means reversible for tilting the platform, and means for locking the platform in its initial position.

5. An apparatus for the purpose specified including a base furnished with a circular track, a frame adapted to turn on said circular track, a platform carried on said frame, means for turning the frame upon said track, means for rocking the frame upon a horizontal axis, means for locking said frame in its initial position, means for tilting the platform upon a horizontal axis, means for automatically returning said platform to its initial position, and means for retaining said platform in such initial position.

6. An apparatus for the purpose specified including a fixed base, a revoluble frame mounted upon said base, a platform carried on the frame, means for revolving said frame upon the base, means for rocking the frame upon a horizontal axis, means for locking the frame in its initial position, means for releasing the frame from its locked position, means for automatically tilting the platform synchronously with the rocking movement of the frame and means for automatically locking the platform when tilted to its initial position.

7. An apparatus for the purpose specified including a base having a circular track, a frame adapted to turn on said track, a platform carried on the frame, means for turning the frame upon said track, means for preventing displacement of the frame from the track, means for rocking the frame upon a horizontal axis, means for automatically locking the frame in a secondary position, means for releasing the frame from a locked position, means for automatically tilting said platform simultaneously with the rocking movement of the frame means for automatically restoring the frame and platform to their initial position and means for automatically locking said frame and platform in their initial positions.

8. An apparatus for the purpose specified including a base provided with a circular track, a frame adapted to turn on the track, a platform carried on said frame, means for turning the frame upon the said track, means for preventing displacement of the frame from the track, means for rocking the frame upon a horizontal axis, means for automatically locking the frame in a plurality of positions, means for releasing the frame from any of its locked positions, means for automatically tilting the said platform simultaneously with the rocking movement of the frame, means for automatically restoring the frame and platform to their initial positions, means for automatically locking said frame and platform in their initial or secondary positions, means for tilting said platform independently of the movements of the frame, means for automatically restoring said platform to its initial position when independently tilted, means for automatically locking said platform in its initial position, said locking means being independent of the means for locking the frame in its initial position, and means for anchoring said base.

In testimony whereof I affix my signature in presence of two witnesses.

ROBERT W. WELLER.

Witnesses:
S. F. STUGLEDER,
F. M. JOHNSTON.